(12) United States Patent
Orfield (10) Patent No.: US 10,918,901 B2
(45) Date of Patent: Feb. 16, 2021

(54) SENSOR EQUIPPED RESISTANCE TRAINING GRIP

(71) Applicant: ShapeLog, Inc., Ann Arbor, MI (US)

(72) Inventor: Nolan Dean Orfield, Ann Arbor, MI (US)

(73) Assignee: ShapeLog, Inc., Ann Arbor, MI (US)

( * ) Notice: Subject to any disclaimer, the term of this patent is extended or adjusted under 35 U.S.C. 154(b) by 143 days.

(21) Appl. No.: 15/492,327

(22) Filed: Apr. 20, 2017

(65) Prior Publication Data

US 2017/0304679 A1 Oct. 26, 2017

Related U.S. Application Data

(60) Provisional application No. 62/324,985, filed on Apr. 20, 2016.

(51) Int. Cl.
*A63B 21/00* (2006.01)
*A63B 71/06* (2006.01)
(Continued)

(52) U.S. Cl.
CPC ...... *A63B 21/0724* (2013.01); *A63B 71/0622* (2013.01); *H04M 1/725* (2013.01); *A63B 21/078* (2013.01); *A63B 2071/0625* (2013.01); *A63B 2071/0655* (2013.01); *A63B 2220/17* (2013.01); *A63B 2220/30* (2013.01); *A63B 2220/40* (2013.01); *A63B 2220/51* (2013.01); *A63B 2220/80* (2013.01); *A63B 2220/803* (2013.01);
(Continued)

(58) Field of Classification Search
CPC ............ A63B 21/0724; A63B 71/0622; A63B 2220/80; A63B 2220/17; A63B 2220/805; A63B 21/078; A63B 2220/30; A63B 2225/54; A63B 2220/51; A63B 2220/833; A63B 2230/75; A63B 2225/20; A63B 2220/803; A63B 2071/0655; A63B 2220/40; A63B 2071/0625; A63B 2225/50; H04M 1/725
See application file for complete search history.

(56) References Cited

U.S. PATENT DOCUMENTS 5,538,486 A * 7/1996 France ............... A63B 21/0552
482/8
6,662,651 B1 * 12/2003 Roth ...................... A61B 5/224
73/379.02

(Continued)

OTHER PUBLICATIONS https://www.indiegogo.com/projects/move-it-your-smart-mobile-connected-personal-gym-fitness#/ Accessed Jul. 20, 2017.

*Primary Examiner* — Sundhara M Ganesan
*Assistant Examiner* — Shila Jalalzadeh Abyaneh
(74) *Attorney, Agent, or Firm* — PatentXP PLLC; Stephen J. Kontos (57) ABSTRACT

An example exercise tracker includes a grip for receiving an adjustable amount of exercise resistance, a force sensor having one or more strain gauges programmed to output a force signal representing a force applied to the grip, and a motion sensor programmed to detect movement of the grip and output a motion signal. The exercise tracker further includes a processor programmed to receive the force signal and the motion signal and determine, from the force signal and the motion signal, exercise data including the amount of resistance applied to the grip.

18 Claims, 5 Drawing Sheets

(51) Int. Cl.
*A63B 21/072* (2006.01)
*H04M 1/725* (2021.01)
*A63B 21/078* (2006.01)

(52) U.S. Cl.
CPC ... *A63B 2220/805* (2013.01); *A63B 2220/833* (2013.01); *A63B 2225/20* (2013.01); *A63B 2225/50* (2013.01); *A63B 2225/54* (2013.01); *A63B 2230/75* (2013.01)

(56) References Cited

U.S. PATENT DOCUMENTS

| | | | |
|---|---|---|---|
| 8,491,446 B2 | 7/2013 | Hinds | |
| 9,782,624 B2* | 10/2017 | Braier | A61B 5/225 |
| 2004/0176226 A1* | 9/2004 | Carlson | A63B 21/00076 |
| | | | 482/112 |
| 2006/0252543 A1* | 11/2006 | Van Noland | A63B 22/00 |
| | | | 463/37 |
| 2008/0119763 A1* | 5/2008 | Wiener | A63B 21/169 |
| | | | 600/587 |
| 2011/0251021 A1* | 10/2011 | Zavadsky | A63B 71/0622 |
| | | | 482/5 |
| 2012/0253489 A1* | 10/2012 | Dugan | A63B 71/0622 |
| | | | 700/91 |
| 2012/0302406 A1* | 11/2012 | Hinds | A63B 21/4021 |
| | | | 482/8 |
| 2013/0172155 A1* | 7/2013 | Adamchick | A63B 21/169 |
| | | | 482/8 |
| 2014/0323271 A1* | 10/2014 | Hinds | A63B 21/0442 |
| | | | 482/8 |
| 2016/0101320 A1* | 4/2016 | Tsutsui | A63B 21/0722 |
| | | | 482/8 |
| 2017/0128765 A1* | 5/2017 | Garretson | G06F 19/00 |

\* cited by examiner

SENSOR EQUIPPED RESISTANCE TRAINING GRIP

CROSS-REFERENCE TO RELATED APPLICATIONS

This application claims priority to U.S. Provisional Patent Application No. 62/324,985 filed on Apr. 20, 2016, titled "Sensor Equipped Resistance Training Apparatus," the contents of which are hereby incorporated by reference in their entirety.

BACKGROUND

The advent of wearable monitors, such as pedometers and heart rate monitors, coupled with the increasing ease with which digital data can be recorded via wireless communication has led to a proliferation of technologies that allow users to track their physical fitness activities. Fitness trackers that communicate directly with a user's mobile phone or computer through Bluetooth, for example, have become common.

DETAILED DESCRIPTION

Despite the increased interest in digitizing and recording users' fitness activity, currently-available products do not accurately capture the activity performed with free weights or resistance bands common in physical therapy, home gyms, and private gyms. Thus, a device which can quantify and record these activities would be beneficial. Resistance bands connected to a grip are one example of a lightweight and portable form of resistance training.

Unlike weights, however, exercisers using resistance bands have little insight into how much force, or "weight," they are experiencing. The bands typically come in color-coded sets with variable "strengths" or resistances but these offer only a vague gauge of workout intensity. Furthermore, unlike with weights, the resistance is not constant, but rather proportional to how far the band is stretched. Consequently, the force supplied by the band is variable across the range of motion of an exercise. This uncertainty significantly reduces the utility and appeal of these tools for regular exercisers and for physical therapists who seek to document progress this limitation is particularly frustrating.

Exercises where a grip receives exercise resistance from a weight, either via a cable or direct connection, are also currently unable to be tracked. While the amount of resistance is often known because of the amount of weight attached to the grip, other information such as the type of exercise being conducted and the number of repetitions performed must be manually recorded. Automating this process for both fixed resistance and variable resistance exercises by tracking all aspects of the exercise would remove friction for the user and facilitate better accountability, motivation, and coaching.

Accordingly, despite the advanced sensors available to those who track their walking, running, and cycling exercise histories, known fitness trackers are not capable of capturing data from resistance training regimens commonly performed in homes and private gyms. Thus, a device which can seamlessly track this data to provide better training insights would be beneficial.

An exercise tracker that addresses this problem is described herein. The sensor equipped grip includes force and motion sensors programmed to output a force signal representing the resistance applied to the grip. The exercise tracker further includes a processor programmed to receive the force signal and determine, from the force signal, exercise data including the adjustable amount of resistance selected by the user. A battery integrated into the exercise tracker powers the processor in addition to the wireless communication device programmed to transmit the exercise data.

Figures 1A, 1B:
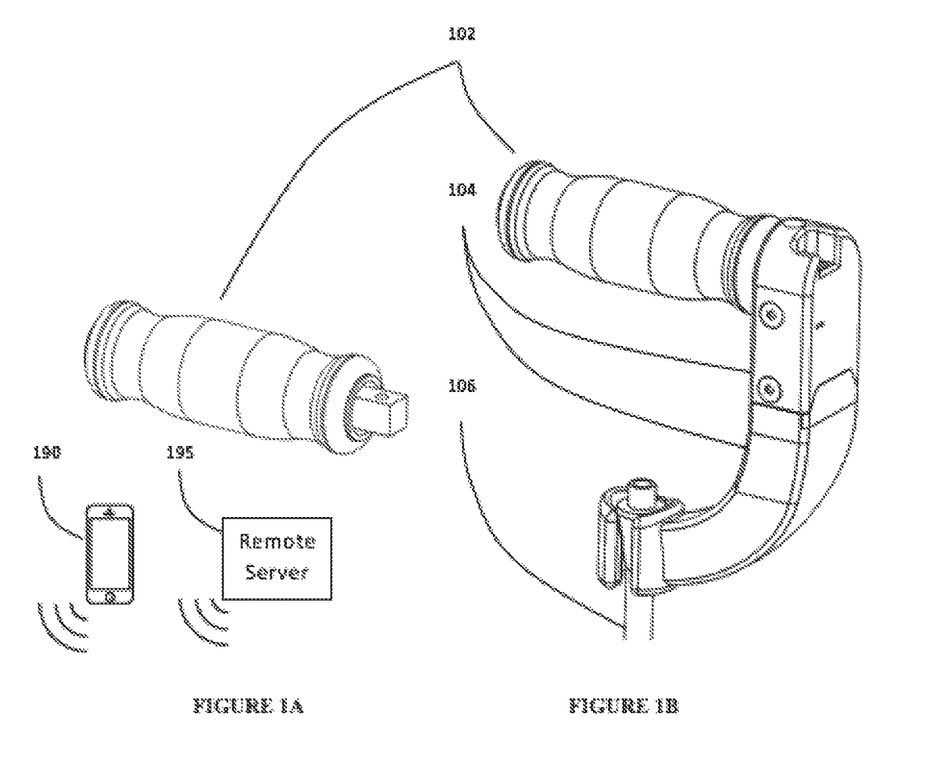
FIGS. 1A and 1B illustrate an example sensor equipped grip that can be used with resistance bands.

FIG. 1A shows one basic form of the sensor equipped grip whereby an outer grip 102 is intended to be clasped by a human hand during exercise. FIG. 1B illustrates how this basic form could be connected to a stretchable resistance band 106 as the form of exercise resistance via structural members 104. The structural members 104 shown are rigid. Thus, the structural members 104 could be formed from a material such as plastic, metal, foam, etc. Alternatively, the structural members 104 could be implemented via a strap or straps. The structural members 104 are also shown to connect on just one side of the grip but could be connected on both sides or consist of a single piece rather than multiple pieces.

Figure 2:
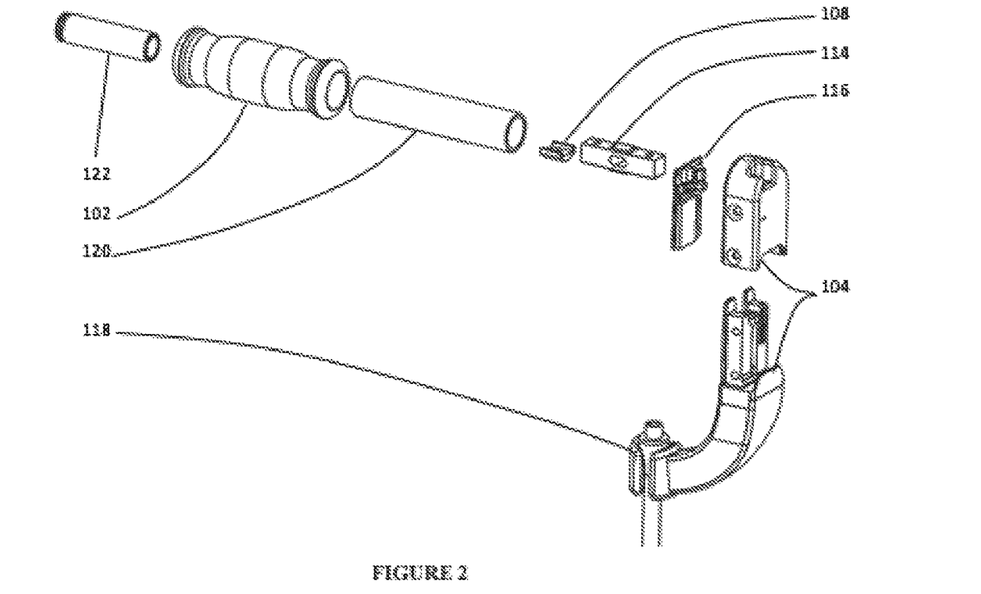
FIG. 2 is an exploded view of the sensor equipped grip.

FIG. 2 shows a similar implementation of the grip in an exploded view to reveal some additional components. The main structural members 104 join a resistance band 106 with one end of a force sensor 114, or load cell. The other end of the force sensor 114 is fixed via a fastener and a curved spacer 108 to a tube 120 which is therefore fixed relative to the main structural members 104. The force sensor 114 is comprised of a piece of structural material such as steel or aluminum with one or more strain gauges laminated onto the structural material in such a fashion that slight deflections of the material caused from loading result in a change in electrical resistance of the strain gauges. This change in electrical resistance can be measured and amplified via a Wheatstone bridge or similar electrical circuit and input into an onboard microprocessor 116 as an electrical force signal and translated into a force value using a linear fit and calibration data. The force signal output by the force sensor 114 may be proportional to the amount of exercise weight resistance selected by the user. A battery 122 provides power for the sensors, microprocessor 116, and the integrated wireless communication device used to transfer the data to a location where it can be further processed.

The user of the exercise tracker illustrated in FIG. 2 might choose to select different resistance bands 106 to target the desired amount of training resistance for specific exercise types or muscle groups. The geometry 118 extending from the structural member 104 is designed to receive an interchangeable set of stretchable resistance bands to accommodate this use case. The microprocessor 116 could provide enhanced tracking capabilities if some properties about the resistance band 106, such as a resistance value of the resistance band 106, were known. For example, the resistance value may be a coefficient of elasticity or the length of the resistance band 106, and knowledge of the coefficient of elasticity or the length of the band 106 could increase the accuracy of the results that are tracked. Therefore, a resistance band sensor 119 could be incorporated into the geometry 118 such that the type or stiffness of cable is automatically detected without any additional input from the user. An optic sensor could identify the color of the cable or the thickness, for example, or magnetic Hall effect-sensors could be used. Physical protrusions on the portion of the resistance band 106 that mate with the geometry 118 could also be used to physical depress sensors in a manner that is unique to each of type of band used with the exercise tracker. Near field communication (NFC) or radio frequency identification (RFID) could also transmit unique identifiers to the microprocessor 116.

The design shown in the FIGS. 1-5 features a standard force sensor 114 that is bolted onto or otherwise fixed to the tube 120 and to the main structural member 104, but another approach could feature strain gauges laminated directly onto one or more of the main structural members 104, effectively using it as the structural component of the load cell 114. Any location where a force from the resistance bands translates into a physical deflection could be suitable for mounting the strain gauges.

Figure 3:
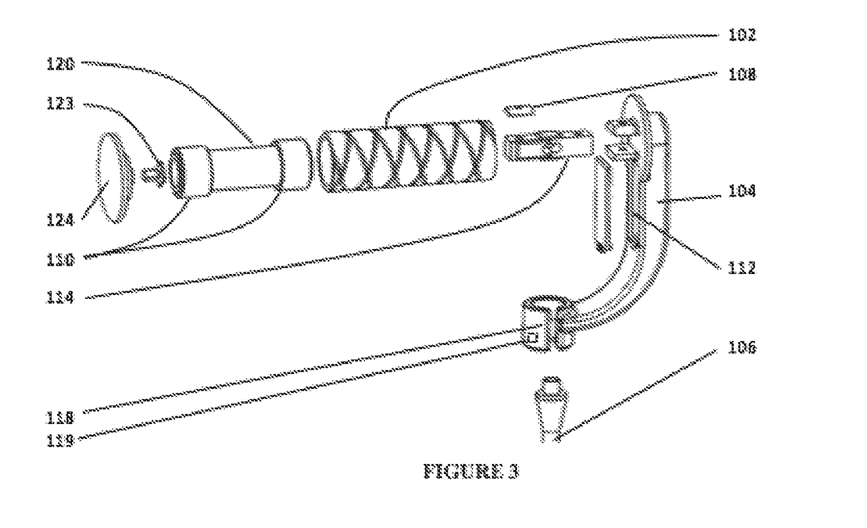
FIG. 3 is an exploded view of another example sensor equipped grip.

FIG. 3 shows a variation on the design shown in FIGS. 1 and 2 whereby a set of bearings 110 separate the fixed tube 120 from the outer grip 102 which can freely rotate if necessary to accommodate exercises where the hand rotates relative to the source of resistance. A grip cap 124 is fixed onto one end of the outer grip 102 to provide a physical boundary on the opposite side of the grip as the main structural member 104. Because this grip cap 124 is fixed onto the outer grip 102, it will also rotate freely relative to the tube 120. The ability of the outer grip 102 and grip cap 124 to rotate independently of the tube 120, however, is not critical.

The structural member 104 features a cavity 112 to house the microcontroller 116 and possibly batteries. Placing the electronics in this location makes wireless communication easier, although the volume within the tube 120 is another option for housing the batteries and electronics. A digital display 129 on the exterior of the main structural member 104 could provide another way to communicate details about the exercise (such as weight resistance) to the exerciser. A vibration motor or haptic device could also be used to communicate with the user. For example, a vibration signal sent through the grip could be used to communicate to the user that his/her target number of repetitions has been achieved. This approach would work well in noisy gym environments, although audio signals transmitted with an integrated speaker 131 could also be used where there is less ambient noise. That is, the microprocessor 116 may be programmed to output an alert via the speaker 131.

Figure 4:
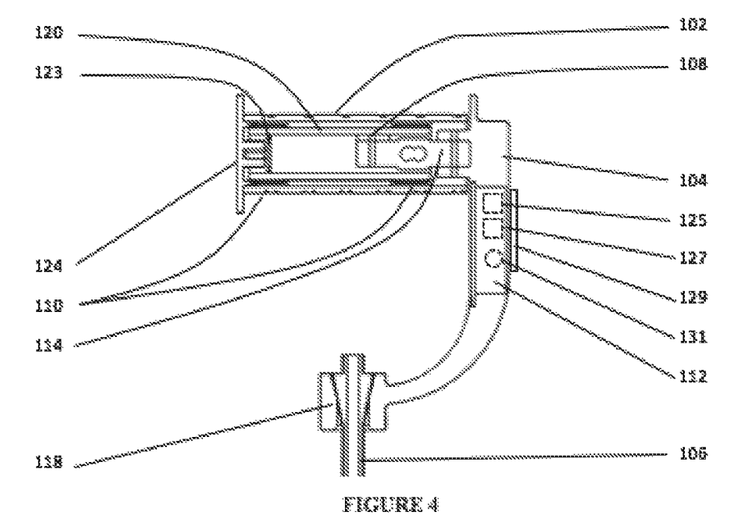
FIG. 4 provides a cross-section view of the sensor equipped grip configuration shown in FIG. 3.

FIG. 4 shows the same sensor equipped grip shown in FIG. 3 but as a cross section to show in greater detail how the load cell 114 is asymmetrically loaded by mounting one side to the tube 120 and the other side to the main structural member 104. This view also provides a better illustration of how the grip cap 124 mounted to the outer grip 102 will rotate a rotary encoder 123 located within the tube.

The rotary encoder 123, which may be programmed to detect rotation of the grip and output a signal representing the rotation of the grip to, e.g., the microprocessor 116, may provide additional details about the motion of the exercise routine and contribute data to a library of algorithms that can identify which exercise is being performed by the user without requiring manual input. For example, a chest press will result in little rotation of the rotary encoder 123 while bicep curls will rotate the rotary encoder approximately ½ of a revolution (180 degrees) during the first repetition then approximately ¼ to ½ of a rotation (90 degrees to 180 degrees, respectively) back and forth for each additional repetition. The rotary encoder 123 may spin freely without any stopping points, meaning it can read relative positions as opposed to absolute positions.

Additional sensors such as a motion sensor 125 could be directly incorporated into the printed circuit board (PCB) along with the microprocessor 116 mounted within the circuit cavity 112. As mentioned before, however, the PCB could also be mounted inside the tube 102. In general, the volume within the tube 102 and a circuit cavity 112 within the main structural member 104 provide space to fit the batteries, load sensor 114, PCB, and any additional auxiliary sensors. The additional motion sensors supplement the load cell and rotary encoder 123 data to extract details about the exercise routine to not only document how much resistance was used but also automatically identify which exercises were performed and any advanced insights about the user's form. Motion sensors allow detection of orientation and movement within several degrees of freedom. For example, a motion sensor could measure the absolute orientation, angular velocity vector, acceleration vector, magnetic field strength vector, linear acceleration vector, and gravity vector. In addition to the examples just given the motion sensor could include an accelerometer or a position sensor such as a lidar, infrared, or ultrasonic sensor.

The combination of the force sensor and motion sensor data, which the microprocessor 116 is programmed to determine from the force signal output by the force sensor 114 and the motion signal output by the motion sensor 125, respectively, allows for calculation of many exercise metrics (referred to as "exercise data") that allow the exerciser to monitor the progress of his/her physical fitness. For example, the user's strength, power output, work output, calorie expenditure, repetition count, and weight resistance settings can all be tracked and compared to historical performance. That is, the microprocessor 116 may be programmed to calculate strength, power output, work output, calorie expenditure, and weight resistance setting from the force signal output by the force sensor 114, the motion signal output by the motion sensor 125, or both. The metrics also allow for engagement with an interactive community whose members could be in close proximity or geographically dispersed. For example, the metrics could be displayed on a leaderboard with real time comparisons of the group of participants, or the participants could be exercising in a home gym environment with a similar leaderboard comparing and monitoring everyone's progress. The workouts that are part of this described experience could be self-guided, loaded on an "on-demand" basis, or streamed live onto the user's television, mobile device, or wearable fitness tracker.

The wireless communication device 127 may include any electronic component, including an antenna, circuits, chips, or other electronic components, configured or programmed to facilitate wireless communication. For instance, the wireless communication device 127 may be programmed to transmit the data collected by the force sensor 114, motion sensor, or both via a telecommunication protocol such as Bluetooth®, Bluetooth Low Energy®, etc., to a remote device 190 (see FIG. 1) such as a mobile phone, smartwatch, or wearable activity tracker, or to a remote server 195 (see FIG. 1), such as a cloud-based server or a server associated with a particular facility (e.g., a gym). The term "server" refers to a computer having a processor and memory. The term "remote" when used in the context of the remote device 190 and remote server 195 may refer to the spatial relationship of the remote device 190, the remote server 195, or both, relative to the exercise tracker. Therefore, although referred to as "remote," the remote device 190 and remote server 195 may be physically near the exercise tracker (i.e., the remote server 195 may be in communication with the exercise tracker, the remote device 190, or both, via a local network connection). Alternatively, the remote device 190 or remote server 195, or both, may be physically "remote" but still in signal communication with the exercise tracker (e.g., the remote server 195 may be cloud-based). Accordingly, in some implementations, the data may be transmitted from the exercise tracker to the remote device 190 or the remote server 195 (see FIG. 1) via a Wi-Fi network connection. The wireless communication device 127 may be programmed to periodically transmit the collected data to the remote device 190 or remote server 195, or transmit the data as it is collected. Alternatively, the wireless communication device 127 may be programmed to transmit the data to the remote device 190 or the remote server 195 at specific times, such as when all repetitions have been performed or when a workout is complete. The wireless communication device 127 may determine that all repetitions have been performed based on the force sensor 114 signal or that the workout is complete in response to a user input provided to the exercise tracker or remote device 190.

The main structural member 104 need not terminate in the geometry 118 shown in FIGS. 1-3. The geometry could feature multiple slots to accommodate multiple resistance bands that can be used in parallel to sum their resistance for more challenging workouts. Alternatively, it could feature a geometry allowing attachment of a stretchable sheet resistance band rather than a tubular resistance band 106. An elastic sheet could be pinched into position, knotted, or otherwise fixed onto the main structural member 104.

Figure 5:
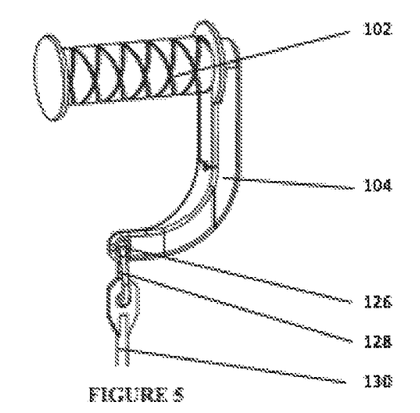
FIG. 5 illustrates an example sensor equipped grip that can be used with cable-based exercise equipment.

FIG. 5 shows another possible geometry for the main structural member 104. In this scenario, the geometry terminates in a simple through-hole 126 or grommet that can be connected with a basic linkage such as a carabiner 128 to a non-elastic cable 130 or other piece of exercise equipment. The sensor equipped grip could connect to a cable 130 that is anchored on its opposite end or linked to a weight. The cable 130 might also be integrated into a weight-stack machine. These machines come in a variety of designs to target a variety of different muscle groups but typically feature at least one stack of weights. The desired fraction of the weights is chosen by placing a pin at the appropriate height in the stack, or by switching a lever to engage the desired number of weights. These weight stack machines could feature a single stack of weights or multiple stacks which could benefit from using two or more sensor equipped grips simultaneously. The cable 130 described herein could be a metal cable sometimes called a wire rope, or could be a rope made from materials other than metal.

The exercise tracker could also utilize the user's own body weight as a form of exercise resistance. For example, the structural members 104 extending from the force sensor 114 could contact the ground to allow trackable push-ups. Alternatively, the structural members 104 could be shaped such that the user could hang from a pull up bar to allow trackable pull-ups or other types of exercises. The sensor equipped grip could also be connected to a second sensor equipped grip in a modular fashion for an even greater variety of trackable functional workout exercises.

Figure 6:
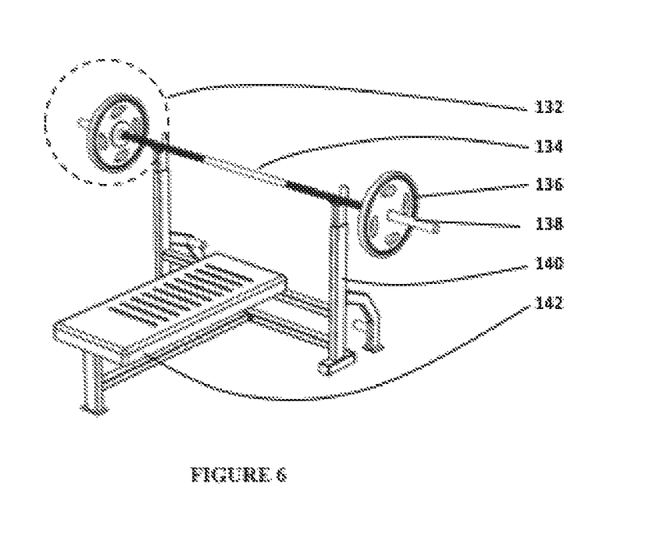
FIG. 6 depicts the sensor equipped grip incorporated into a weightlifting bar (e.g., a barbell).

FIG. 6 presents an overview of the sensor equipped grip integrated into a longer bar, such as a barbell, intended for operation with both hands and free weights, such as variable weights loaded onto the bar. The figure shows one example of such a machine, although they come in a wide variety of forms depending on the manufacturer of the machine and the specific muscle group the exercise seeks to target. The example shown is for a bench press exercise in which a bar 134 that is gripped by hands during the exercise is set atop a frame 140 which in this case also includes a padded bench 142 for the user to lay atop during the routine. Before exercising the user mounts variable weights 136 onto a sleeve 138 connected to the bar 134 to achieve the target resistance, then positions himself/herself atop the bench 142. Once in position the exerciser lifts the bar 134, moves the weight for a number of repetitions, then returns the bar 134 to the machine's frame 140. The circled region 132 represents a region examined in more detail in the following figure with the weight removed for purposes of clarity.

Figure 7A:
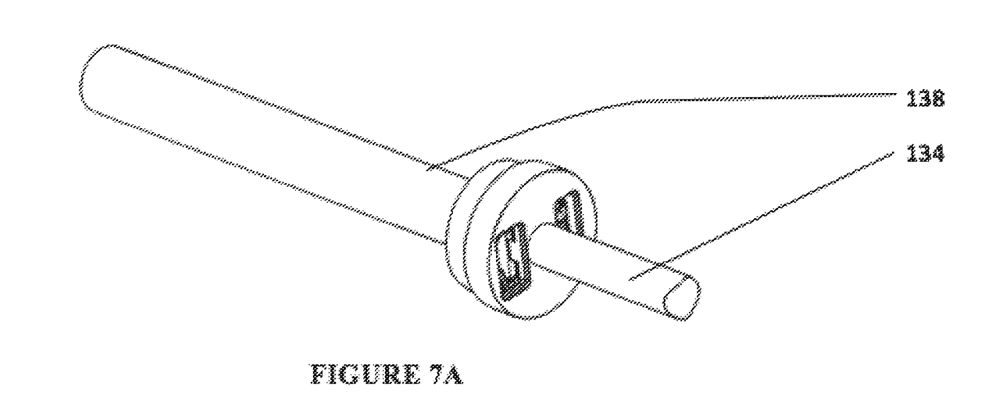
FIGS. 7A and 7B examine subsections of FIG. 6 in greater detail, with a perspective of both the assembled and exploded view of the sensor equipped grip.
Figure 7B:
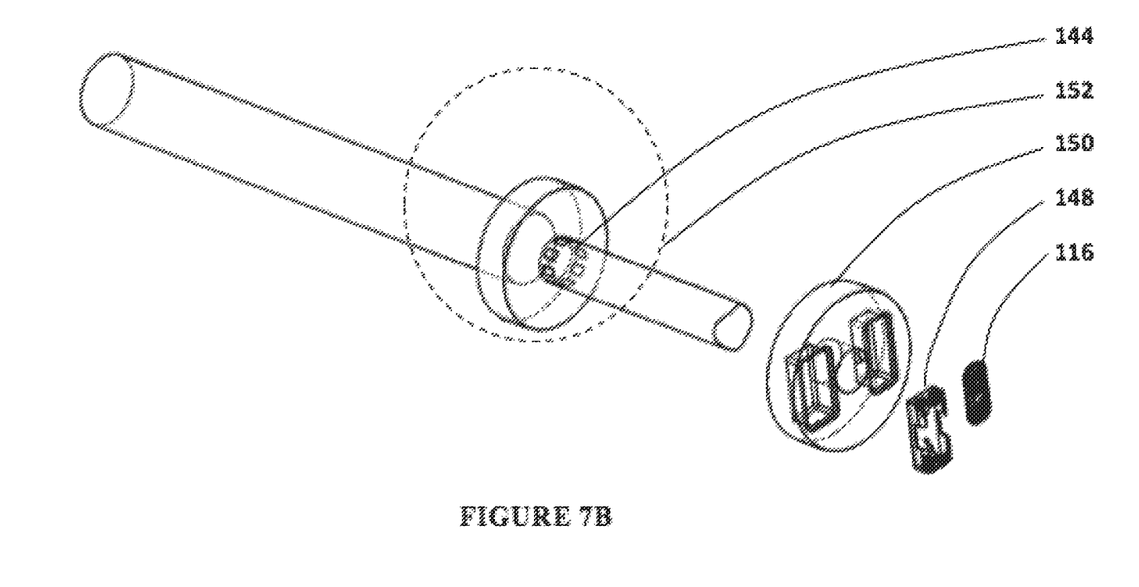

FIG. 7 shows in more detail the circled region 132 from FIG. 6. The bar 134 is cut away for clarity. FIG. 7a shows the sensor equipped grip in assembled form, while FIG. 7b shows an exploded view to reveal the principal mechanism used to detect the amount of weight resistance loaded onto the sleeve 138. The sensor equipped grip shown in FIGS. 7a and 7b includes a force sensor comprised of a plurality of strain gauges 144 laminated around the circumference of the bar 134. These strain gauges 144 are positioned between the sleeve 138 where weights are loaded and the interior portion of the bar 134 where hands will grip during the exercise routine. In such a position the strain gauges 144 will be able to measure deflections in the bar 134 and therefore how much weight 136 has been loaded onto the sleeve 138. As the weights 136 are accelerated upward and downward during the exercise, the strain gauges 144 will measure fluctuating forces but the average value will indicate how much weight has been loaded on that half of the bar. This force sensor mechanism featuring a plurality of strain gauges 144 around the circumference of the bar could be located on both sides of the bar 134 (i.e. adjacent to both of the sleeves 138) but this is not mandatory because bars are generally loaded in a balanced fashion with the same amount of weights 136 on each respective sleeve 138. Lifting the bar with weights 136 loaded onto the sleeve 138 will cause the bar 134 to flex and therefore a change in electrical resistance in the strain gauges 144.

The amount of flex experienced by the bar 134, and therefore the amount of weight 136 loaded onto the sleeve 138, is proportional to the amount of electrical resistance change in the strain gauges 144. This value can be observed by configuring the strain gauges 144 in a Wheatstone bridge or similar circuit then amplified to a voltage which can be observed by the microprocessor 116. On board batteries 148 power the microprocessor 116 which could also include a motion sensor, as discussed earlier, to detect additional details about the workout routine. For example, these additional sensors could detect the range of motion of the exercise, whether the bar is being bounced off of a body part or moved freely, or whether the bar is kept level to the ground throughout the repetitions. The PCB which includes the microprocessor 116 also includes a wireless communication device 127 such as Bluetooth®, Bluetooth® Smart (or Bluetooth® Low Energy), Wi-Fi, or any other wireless communication protocol. In this example, the microprocessor 116 and batteries 148 are enclosed in a housing 150 with an ingress for the strain gauge wires.

A plurality of strain gauges 144 may be used so that the bar can rotate in any position and still detect how much force is being applied to the bar. By placing the strain gauges opposite one another the pair of strain gauges can be used in parallel in the Wheatstone bridge circuit to increase the sensitivity and preserve a balanced circuit. The circuit can be balanced in such a way that deflections in any direction are therefore measurable. Alternatively, the strain gauges 144 can be balanced with a simple resistor or a strain gauge oriented such that its resistance does not change when the bar is flexed by the weights, therefore isolating individual strain gauge resistance changes. The circled region 152 shows the area examined in more detail in FIG. 8.

Figure 8:
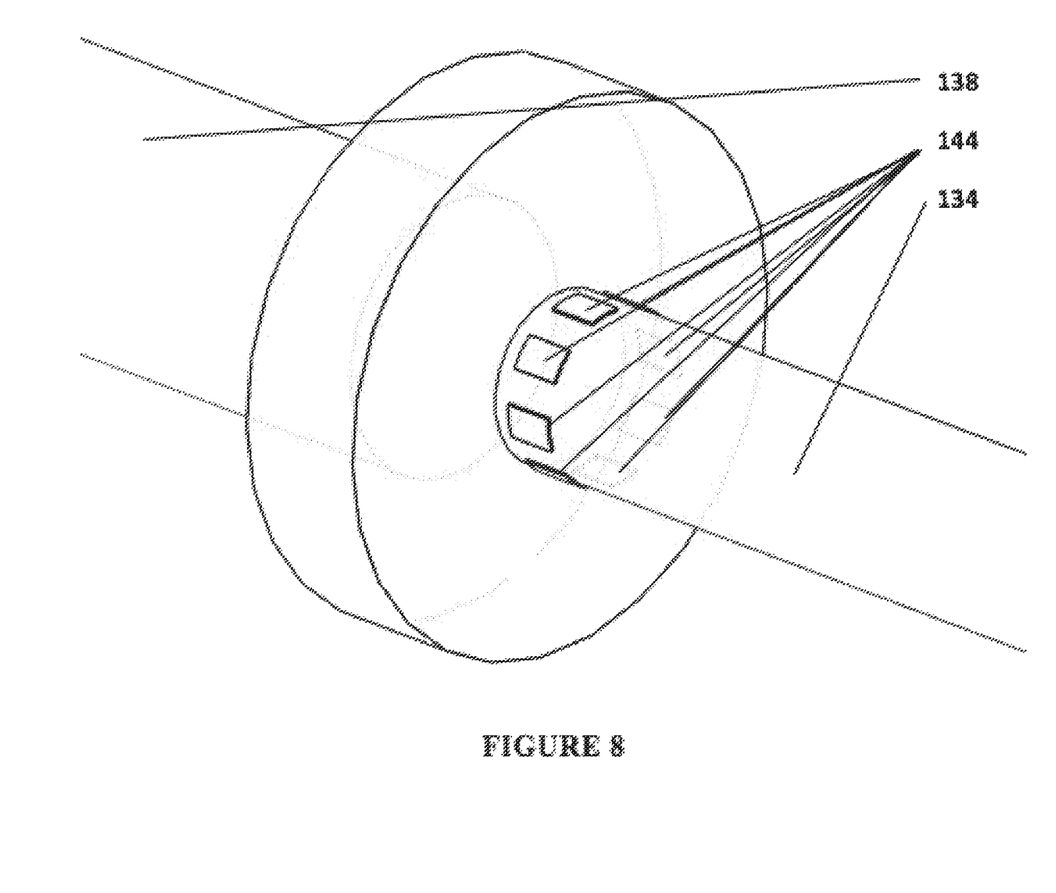
FIG. 8 further examines a subsection of FIG. 7 to specifically illustrate a possible mounting configuration for the plurality of strain gauges that comprise that force sensor.

Each of the individual strain gauges 144 shown in FIG. 8 could be an individual strain gauge, a pair of strain gauges (often integrated on a single foil) oriented at 90 degrees from one another such that one is active and the other balances the Wheatstone bridge circuit, or two parallel strain gauges that are both active but only one will yield a positive voltage output at any given time depending on the orientation of the bar.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX, macOS, and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An exercise tracker comprising:
   a structural member with an opening for receiving a resistance band;
   a grip having a tube;
   a force sensor partially located inside the tube and having one or more strain gauges extending from the tube of the grip to the structural member, wherein the force sensor is programmed to output a force signal representing a force applied to the grip;
   a motion sensor programmed to detect movement of the grip and output a motion signal;
   a processor programmed to receive the force signal and the motion signal and determine, from the force signal and the motion signal, exercise data including the amount of resistance applied to the grip; and
   a resistance band sensor disposed on the structural member and programmed to detect a resistance value of the resistance band.

2. The exercise tracker of claim 1, further comprising a rotary encoder programmed to detect rotation of the grip and output signals to the processor, wherein the processor is programmed to determine the exercise data based at least in part on the signals output by the rotary encoder.

3. The exercise tracker of claim 2, wherein the processor is programmed to determine a type of exercise performed based at least in part on the signals output by the rotary encoder.

4. The exercise tracker of claim 1, wherein the motion sensor is an accelerometer.

5. The exercise tracker of claim 1, further comprising a memory wherein the processor is programmed to store the exercise data in the memory.

6. The exercise tracker of claim 1, wherein the processor is programmed to command a wireless communication device to transmit the exercise data to a remote device.

7. The exercise tracker of claim 1, further comprising a digital display programmed to display the exercise data.

8. The exercise tracker of claim 1, further comprising a haptic device located in the grip, and wherein the processor is programmed to cause the haptic device to vibrate.

9. The exercise tracker of claim 1, further comprising speakers, wherein the processor is programmed to output an alert signal to the speakers.

10. The exercise tracker of claim 1, further comprising a wireless communication device programmed to wirelessly transmit the exercise data to a remote device.

11. The exercise tracker of claim 1, wherein the processor is programmed to calculate a calorie expenditure from one or more of the force signal and the motion signal.

12. The exercise tracker of claim 1, wherein the resistance band sensor is programmed to detect the resistance value of the resistance based at least in part on a characteristic of the resistance band, wherein the characteristic includes at least one of a color of the resistance band and a thickness of the resistance band.

13. The exercise tracker of claim 1, wherein the resistance band sensor is programmed to detect a portion of the resistance band inserted into the opening.

14. The exercise tracker of claim 1, wherein the resistance band sensor includes an optical sensor or a magnetic Hall effect sensor.

15. The exercise tracker of claim 1, wherein the resistance value includes at least one of a length of the resistance band and a coefficient of elasticity of the resistance band.

16. An exercise tracker comprising:
   a structural member with an opening for receiving a resistance band;
   a grip having a tube;
   a force sensor partially located inside the tube and having one or more strain gauges extending from the tube of the grip to the structural member, wherein the force sensor is programmed to output a force signal representing a force applied to the grip;
   a motion sensor programmed to detect movement of the grip and output a motion signal representing the movement of the grip;
   a processor programmed to receive the force signal and motion signal and determine, from the force signal and the motion signal, exercise data including the amount of resistance applied to the grip;
   a resistance band sensor disposed on the structural member and programmed to detect a resistance value of the resistance band;
   a battery electrically connected to one or more of the force sensor, the motion sensor, and the processor;
   a wireless communication device programmed to wirelessly transmit the exercise data; and
   a display programmed to display exercise metrics.

17. The exercise tracker of claim 16, wherein the display is programmed to display exercise metrics from multiple users in close physical proximity to one another.

18. The exercise tracker of claim 16, wherein the display is programmed to display exercise metrics from multiple users who are geographically dispersed.

* * * * *